US010044740B2

United States Patent
Mohanty et al.

(10) Patent No.: US 10,044,740 B2
(45) Date of Patent: Aug. 7, 2018

(54) METHOD AND APPARATUS FOR DETECTING SECURITY ANOMALIES IN A PUBLIC CLOUD ENVIRONMENT USING NETWORK ACTIVITY MONITORING, APPLICATION PROFILING AND SELF-BUILDING HOST MAPPING

(71) Applicant: Symantec Corporation, Mountain View, CA (US)

(72) Inventors: Shubhabrata Mohanty, Pune (IN); Sudha Iyer, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 391 days.

(21) Appl. No.: 14/854,658

(22) Filed: Sep. 15, 2015

(65) Prior Publication Data

US 2017/0078314 A1    Mar. 16, 2017

(51) Int. Cl.
*H04L 29/06* (2006.01)
*G06F 21/55* (2013.01)

(52) U.S. Cl.
CPC .......... *H04L 63/1425* (2013.01); *G06F 21/55* (2013.01); *H04L 63/0263* (2013.01);
(Continued)

(58) Field of Classification Search
CPC ........ G06F 21/56; G06F 21/566; G06F 21/50; H04L 63/14; H04L 63/1408;
(Continued)

(56) References Cited

U.S. PATENT DOCUMENTS

2014/0090059 A1\* 3/2014 Wang ................. H04L 63/1416
726/23
2014/0280889 A1\* 9/2014 Nispel .................... H04L 43/04
709/224

OTHER PUBLICATIONS

"Deploying a CakePHP Application to Elastic Beanstalk", http://docs.aws.amazon.com/elasticbeanstalk/latest/dg/create_deploy_PHP_cakePHP.html. as accessed Aug. 13, 2015, Amazon Web Services, (Dec. 1, 2010).

(Continued)

*Primary Examiner* — Edward Zee
(74) *Attorney, Agent, or Firm* — FisherBroyles, LLP

(57) ABSTRACT

The disclosed computer-implemented method for detecting security anomalies in a public cloud environment using network activity monitoring, application profiling, and self-building host mapping may include (1) collecting host information that identifies (A) at least one communication channel that has previously facilitated communication between at least one host computing platform within a cloud computing environment and at least one additional computing platform and/or (B) at least one application that has previously run on the host computing platform, (2) monitoring network traffic involving the host computing platform, (3) detecting, while monitoring the network traffic, network activity that is inconsistent with the collected host information, and then (4) determining that the detected network activity represents a potential security threat within the cloud computing environment due at least in part to the detected network activity being inconsistent with the collected host information. Various other methods, systems, and computer-readable media are also disclosed.

16 Claims, 7 Drawing Sheets

(52) U.S. Cl.
CPC ............ *H04L 63/14* (2013.01); *H04L 63/145* (2013.01); *H04L 63/1441* (2013.01)

(58) Field of Classification Search
CPC ............ H04L 63/1416; H04L 63/1425; H04L 63/1441; H04L 63/20
See application file for complete search history.

(56) References Cited

OTHER PUBLICATIONS

"Applipedia", https://applipedia.paloaltonetworks.com/, as accessed Aug. 13, 2015, Palo Alto Networks, (Aug. 25, 2013).

\* cited by examiner

METHOD AND APPARATUS FOR DETECTING SECURITY ANOMALIES IN A PUBLIC CLOUD ENVIRONMENT USING NETWORK ACTIVITY MONITORING, APPLICATION PROFILING AND SELF-BUILDING HOST MAPPING

BACKGROUND

Cloud computing environments often implement security systems to protect against intrusion and/or infection. For example, a cloud computing environment may include multiple physical hosts that facilitate the execution of Virtual Machines (VMs). In this example, the cloud computing environment may implement a Host-based Intrusion Detection System (HIDS) and/or a Host-based Intrusion Prevention System (HIPS) that protects the physical or virtual hosts from intrusion and/or infection. The protection of the HIDS and/or the HIPS may be controlled by certain policies defined by an administrator of the cloud computing environment.

Unfortunately, the process of investigating the security needs of the cloud computing environment and then defining the HIDS and/or HIPS policies for the cloud computing environment may be cumbersome and/or time-intensive. As a result, the administrator may be unable to properly address those security needs and/or other cloud computing tasks due to his or her limited human resources. For example, a VM may launch on a physical host within the cloud computing environment and then quickly shut down in a fairly short amount of time. In this example, the administrator may be unable to determine the security needs of the VM and then define an HIDS and/or HIPS policy for the VM within that short amount of time.

As another example, the administrator may be handling other cloud computing tasks when a VM launches on a physical host within the cloud computing environment. In this example, the administrator may be unable to determine the security needs of the VM and then define an IDS and/or IPS policy for the VM since he or she was handling the other cloud computing tasks when the VM launched. As a result, the security of the cloud computing environment may have certain deficiencies, potentially leaving the cloud computing environment vulnerable to security threats. The instant disclosure, therefore, identifies and addresses a need for additional and improved systems and methods for detecting security anomalies in a public cloud environment using network activity monitoring, application profiling, and self-building host mapping.

As a further example, an infected VM may have access to its peer VM instances within the same auto-scaling or subnet group but have no access to other peer VM instances outside of that auto-scaling or subnet group. In this example, the administrator may be unaware of the overall communication topology and/or overall access pattern of a new VM instance within that auto-scaling or subnet group. As a result, the administrator may be unable to determine the security needs of the new VM instance and/or which access privileges to grant to the new VM instance. Accordingly, the security of the new VM instance and/or the auto-scaling or subnet group may have certain deficiencies, potentially leaving them vulnerable to security threats.

The instant disclosure, therefore, identifies and addresses a need for additional and improved systems and methods for detecting security anomalies in a public cloud environment using network activity monitoring, application profiling, and self-building host mapping.

SUMMARY

As will be described in greater detail below, the instant disclosure describes various systems and methods for detecting security anomalies in a public cloud environment using network activity monitoring, application profiling, and self-building host mapping.

In one example, a computer-implemented method for detecting security anomalies in a public cloud environment using network activity monitoring, application profiling, and self-building host mapping may include (1) collecting host information that identifies (A) at least one communication channel that has previously facilitated communication between at least one host computing platform within a cloud computing environment and at least one additional computing platform and/or (B) at least one application that has previously run on the host computing platform or been installed through an approved cloud-platform-specific deployment process within the cloud computing environment, (2) monitoring network traffic involving the host computing platform within the cloud computing environment, (3) detecting, while monitoring the network traffic, network activity that is inconsistent with the collected host information, and then (4) determining that the detected network activity represents a potential security threat within the cloud computing environment due at least in part to the detected network activity being inconsistent with the collected host information.

In some examples, the method may also include performing at least one security action in connection with the host computing platform in an attempt to remedy the potential security threat. In one example, the security action may include and/or represent quarantining the host computing platform relative to the cloud computing environment to prevent the host computing platform from infecting any other host computing platforms within the cloud computing environment. In another example, the security action may include and/or represent shutting down the host computing platform to prevent the host computing platform from infecting any other host computing platforms within the cloud computing environment.

In a further example, the security action may include and/or represent blocking communication between the host computing platform and any other host computing platforms within the cloud computing environment. Additionally or alternatively, the security action may include and/or represent replacing the host computing platform within the cloud computing environment by transferring at least one computing task of the host computing platform to at least one additional host computing platform within the cloud computing environment.

In one example, the method may also include calculating, based at least in part on the detected network activity, a risk score of the potential security threat. In this example, the method may further include identifying at least one security action that is commensurate with the risk score and then performing the security action that is commensurate with the risk score in connection with the host computing platform.

In one example, the method may also include creating, based at least in part on the host information, a host-specific communication profile that identifies known trusted communications between the host computing platform and the additional computing platform. Additionally or alternatively, the method may include creating, based at least in part on the host information, a host-specific application profile that identifies known trusted applications by leveraging cloud-platform-specific deployment tools and technologies.

In one example, the method may also include comparing the detected network activity against the host-specific communication profile and/or the host-specific application profile. In this example, the method may further include determining, based at least in part on the comparison, that the host computing platform has not previously performed the detected network activity.

In one example, the method may also include obtaining at least a portion of the host information from a cloud service provider that services the cloud computing environment. Additionally or alternatively, the method may include obtaining at least a portion of the host information from a cloud deployment tool used in connection with the cloud computing environment.

In one example, the method may also include creating the host-specific communication profile by applying a machine learning algorithm to at least a portion of the host information. Additionally or alternatively, the method may include creating the host-specific application profile by applying a machine learning algorithm to at least a portion of the host information.

In one example, the method may also include updating, based at least in part on the detected network activity, the host information to improve the accuracy of security threat detection within the cloud computing environment. Additionally or alternatively, the method may include identifying, based at least in part on the detected network activity, an attack path of the potential security threat with respect to the host computing platform within the cloud computing environment using the host logs (e.g., bastion host logs) accessed by the host.

In one example, the method may also include collecting additional host information that identifies at least one application that has previously run on the additional host computing platform within the cloud computing environment or been installed through an approved cloud-platform-specific deployment process. In this example, the method may further include creating, based at least in part on the host information and the additional host information, an application whitelist that identifies applications known to be trusted across all host computing platforms within the cloud computing environment.

As another example, a system for implementing the above-described method may include (1) a collection module, stored in memory, that collects host information that identifies (A) at least one communication channel that has previously facilitated communication between at least one host computing platform within a cloud computing environment and at least one additional computing platform and/or (B) at least one application that has previously run on the host computing platform or been installed through an approved cloud-platform-specific deployment process within the cloud computing environment, (2) a monitoring module, stored in memory, that (A) monitors network traffic involving the host computing platform within the cloud computing environment and (B) detects, while monitoring the network traffic, network activity that is inconsistent with the collected host information, (3) a security module, stored in memory, that determines that the detected network activity represents a potential security threat within the cloud computing environment due at least in part to the detected network activity being inconsistent with the collected host information, and (4) at least one physical processor that executes the collection module, the monitoring module, and the security module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) collect host information that identifies (A) at least one communication channel that has previously facilitated communication between at least one host computing platform within a cloud computing environment and at least one additional computing platform and/or (B) at least one application that has previously run on the host computing platform or been installed through an approved cloud-platform-specific deployment process within the cloud computing environment, (2) monitor network traffic involving the host computing platform within the cloud computing environment, (3) detect, while monitoring the network traffic, network activity that is inconsistent with the collected host information, and then (4) determine that the detected network activity represents a potential security threat within the cloud computing environment due at least in part to the detected network activity being inconsistent with the collected host information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
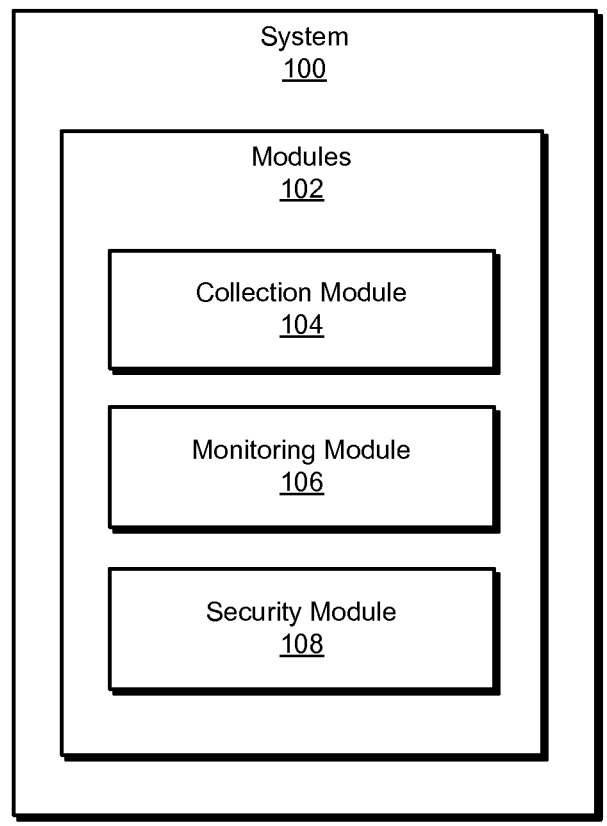
FIG. 1 is a block diagram of an exemplary system for detecting security anomalies in a public cloud environment using network activity monitoring, application profiling, and self-building host mapping.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting security anomalies in a public cloud environment using network activity monitoring, application profiling, and self-building host mapping. As will be explained in greater detail below, by collecting historical information about a host computing platform within a cloud computing environment, the systems and methods described herein may be able to build a communication profile, host profile, and/or application profile of the host computing platform. By building such a communication profile, host profile, and/or application profile of the host computing platform, the systems and methods described herein may be able to identify and/or reference (1) known trusted communications between the host computing platform and an additional computing platform within the cloud computing environment and/or (2) known trusted applications that have been previously executed by the host computing platform and/or whitelisted.

The systems and methods described herein may then monitor network traffic within the cloud computing environment to determine whether any network activity is anomalous and/or inconsistent with the communication and/or application profile. In the event that anomalous and/or inconsistent network activity is detected, the systems and methods described herein may assess the degree of risk associated with such network activity and then perform a security action in an attempt to remedy the potential security threat corresponding to the assessed degree of risk.

The following will provide, with reference to FIGS. 1, 2, 4, and 5, detailed descriptions of exemplary systems for detecting security anomalies in a public cloud environment using network activity monitoring, application profiling, and self-building host mapping. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting security anomalies in a public cloud environment using network activity monitoring, application profiling, and self-building host mapping. As illustrated in this figure, exemplary system 100 may include one or more modules 102 for performing one or more tasks. For example, and as will be explained in greater detail below, exemplary system 100 may include a collection module 104 that collects host information that identifies (1) at least one communication channel that has previously facilitated communication between at least one host computing platform within a cloud computing environment and at least one additional computing platform and/or (2) at least one application that has previously run on the host computing platform within the cloud computing environment.

Exemplary system 100 may also include monitoring module 106 that (1) monitors network traffic involving the host computing platform within the cloud computing environment and (2) detects, while monitoring the network traffic, network activity that is inconsistent with the collected host information. In addition, and as will be described in greater detail below, exemplary system 100 may include a security module 108 that determines that the detected network activity represents a potential security threat within the cloud computing environment due at least in part to the detected network activity being inconsistent with the collected host information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., host computing platforms 202(1)-(N) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
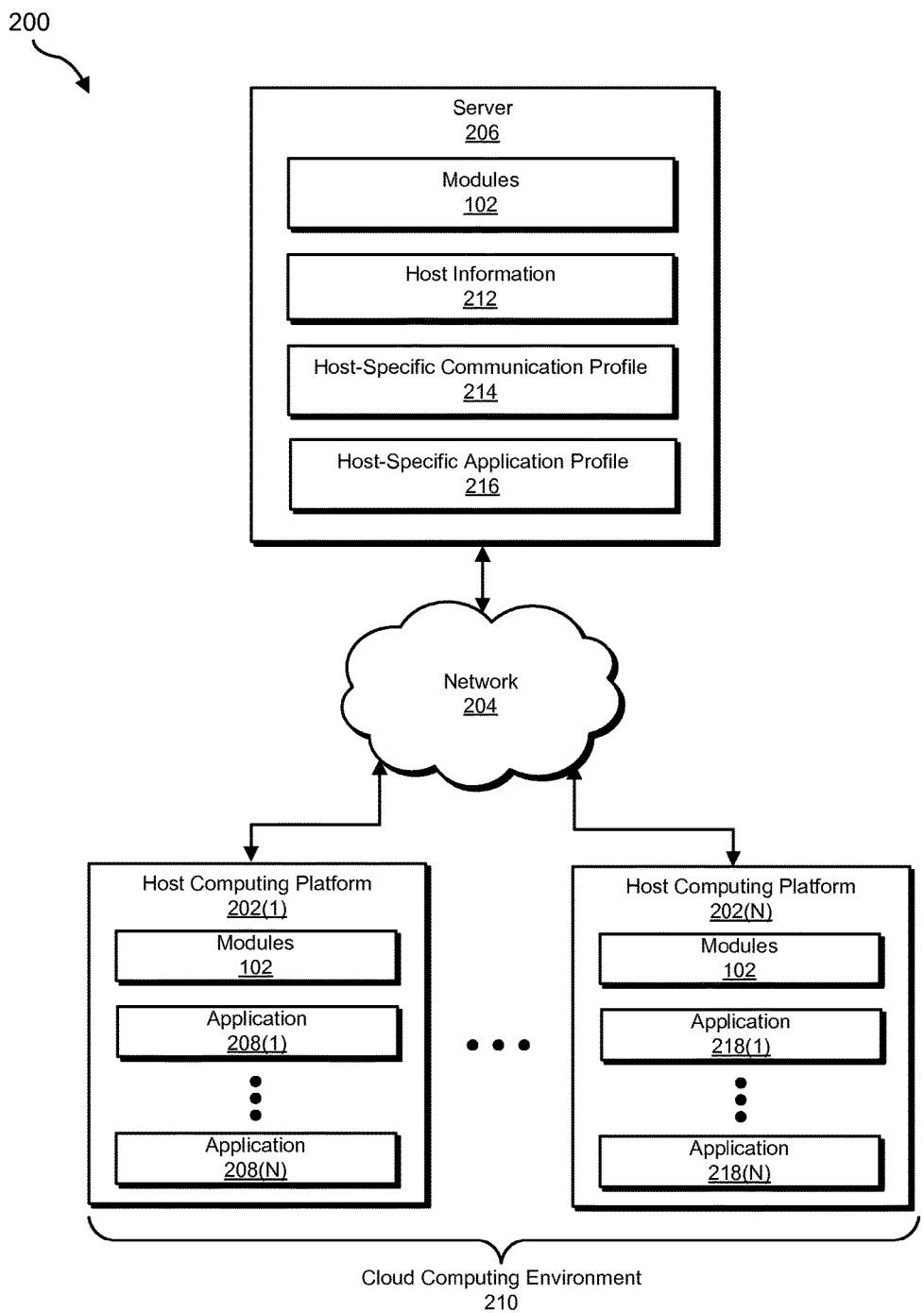
FIG. 2 is a block diagram of an additional exemplary system for detecting security anomalies in a public cloud environment using network activity monitoring, application profiling, and self-building host mapping.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 206 in communication with host computing platforms 202(1)-(N) via a network 204. In some examples, host computing platforms 202(1)-(N) may each be programmed with one or more of modules 102. In one example, host computing platform 202(1) may include and/or be capable of executing one or more applications 208(1)-(N). Similarly, host computing platform 202(N) may include and/or be capable of executing one or more applications 218(1)-(N).

Additionally or alternatively, server 206 may be programmed with one or more of modules 102. In one example, server 206 may collect host information 212 that identifies (1) at least one communication channel that has previously facilitated communication between at least one host computing platform (e.g., host computing platform 202(1) and/or host computing platform 202(N)) within a cloud computing environment and at least one additional computing platform and (2) any applications (e.g., applications 208(1)-(N) and/or applications 218(1)-(N)) that have previously run on the host computing platform within the cloud computing environment.

In one example, server 206 may create a host-specific communication profile 214 that identifies known trusted communications between the host computing platform and the additional computing platform based at least in part on host information 212. Additionally or alternatively, server 206 may create a host-specific application profile 216 that identifies known trusted applications previously executed by the host computing platform based at least in part on host information 212.

In one embodiment, one or more of modules 102 from FIG. 1 may, when executed by at least one processor of host computing platforms 202(1)-(N) and/or server 206, enable host computing platforms 202(1)-(N) and/or server 206 to detect potential security threats in cloud computing environments. For example, and as will be described in greater detail below, one or more of modules 102 may cause server 206 to (1) collect host information 212 that identifies (A) at least one communication channel that has previously facilitated communication between host computing platform 202(1) within cloud computing environment 210 and at least one additional computing platform and/or (B) at least one application that has previously run on host computing platform 202(1) within cloud computing environment 210, (2) monitor network traffic involving host computing platform 202(1) within cloud computing environment 210, (3) detect, while monitoring the network traffic, network activity that is inconsistent with host information 212, and then (4) determine that the detected network activity represents a potential security threat within cloud computing environment 210 due at least in part to the detected network activity being inconsistent with host information 212.

Host computing platforms 202(1)-(N) each generally represent any type or form of computing device capable of reading computer-executable instructions. Examples of host computing platforms 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations of one or more of the same, combinations of one or more of the same, exemplary computing system 610 in FIG. 6, or any other suitable host computing platforms.

Server 206 generally represents any type or form of computing device capable of collecting host information about a host computing platform and then monitoring network traffic to identify any potentially anomalous activity involving the host computing platform. Examples of server 206 include, without limitation, application servers, security servers, web servers, storage servers, deduplication servers, and/or database servers configured to run certain software applications and/or provide various security, web, storage, deduplication, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, variations of one or more of the same, combinations of one or more of the same, or any other suitable network. Network 204 may facilitate communication or data transfer using wireless and/or wired connections. In one embodiment, network 204 may facilitate communication among host computing platforms 202(1)-(N) and server 206.

Applications 208(1)-(N) and 218(1)-(N) each generally represent any type or form of software application or program capable of being installed, deployed, executed, and/or otherwise implemented on a computing system. Examples of applications 208(1)-(N) and 218(1)-(N) include, without limitation, virtual machines, enterprise software, entertainment software, security applications, cloud-based applications, web applications, mobile applications, integrated software, application packages, application suites, variations of one or more of the same, combinations of one or more of the same, or any other suitable applications.

Host information 212 generally represents any type or form of information about and/or involving a host computing platform within a cloud computing environment. Examples of host information 212 include, without limitation, data about application instances that have run on a host computing platform, data identifying which host computing platforms are running within a cloud computing environment, data identifying communication channels that are expected to be used by a host computing platform, data identifying applications that are expected to run on a host computing platform, data about applications installed on a host computing platform, data indicating normal processing workloads and/or power consumption of a host computing platform, data indicating whether a host computing platform is included in a virtual cloud, a public subnet, and/or a private subnet, data indicating whether a host computing platform is included in an auto-scaling group, data identifying each host computing platform included in an auto-scaling group, data identifying firewall rules that define allowed communication protocols and/or ports, data identifying whether a host computing platform's IP address is public or private, data that identifies application-specific characteristics, data that identifies trusted and/or whitelisted applications, processes, and/or communications, data that identifies resource usage, operation count, and/or running time of applications, variations of one or more of the same, combinations of one or more of the same, or any other suitable host information.

Host-specific communication profile 214 generally represents any type or form of summary, map, history, and/or characterization of the communications of a host computing platform. In one example, host-specific communication profile 214 may include, be created from, and/or be based on at least a portion of host information 212. For example, host-specific communication profile 214 may include and/or identify the communication protocols used by host computing platform 202(1), any communication ports used by host computing platform 202(1) to communicate with other computing devices, the computing devices with which host computing platform 202(1) has communicated, and/or the amount of network traffic involved in such communications. Additionally or alternatively, host-specific communication profile 214 may include and/or identify the communication protocols used by host computing platform 202(N), any communication ports used by host computing platform 202(N) to communicate with other computing devices, the computing devices with which host computing platform 202(N) has communicated, and/or the amount of network traffic involved in such communications. Although FIG. 2 illustrates only one host-specific communication profile, alternative embodiments may include and/or involve multiple host-specific communication profiles corresponding to host computing platforms 202(1)-(N).

Host-specific application profile 216 generally represents any type or form of summary, map, history, and/or characterization of the application usage of a host computing platform. In one example, host-specific application profile 216 may include, be created from, and/or be based on at least a portion of host information 212. For example, host-specific application profile 216 may include and/or identify any applications installed on computing platform 202(1), any applications that have run on and/or been executed by host computing platform 202(1), any trusted and/or whitelisted applications, characteristics of such applications, and/or the resource usage, operation count, and/or running time of such applications. Additionally or alternatively, host-specific application profile 216 may include and/or identify any applications installed on computing platform 202(N), any applications that have run on and/or been executed by host computing platform 202(N), any trusted and/or whitelisted applications, characteristics of such applications, and/or the resource usage, operation count, and/or running time of such applications. Although FIG. 2 illustrates only one host-specific application profile, alternative embodiments may include and/or involve multiple host-specific application profiles corresponding to host computing platforms 202(1)-(N).

Figure 3:
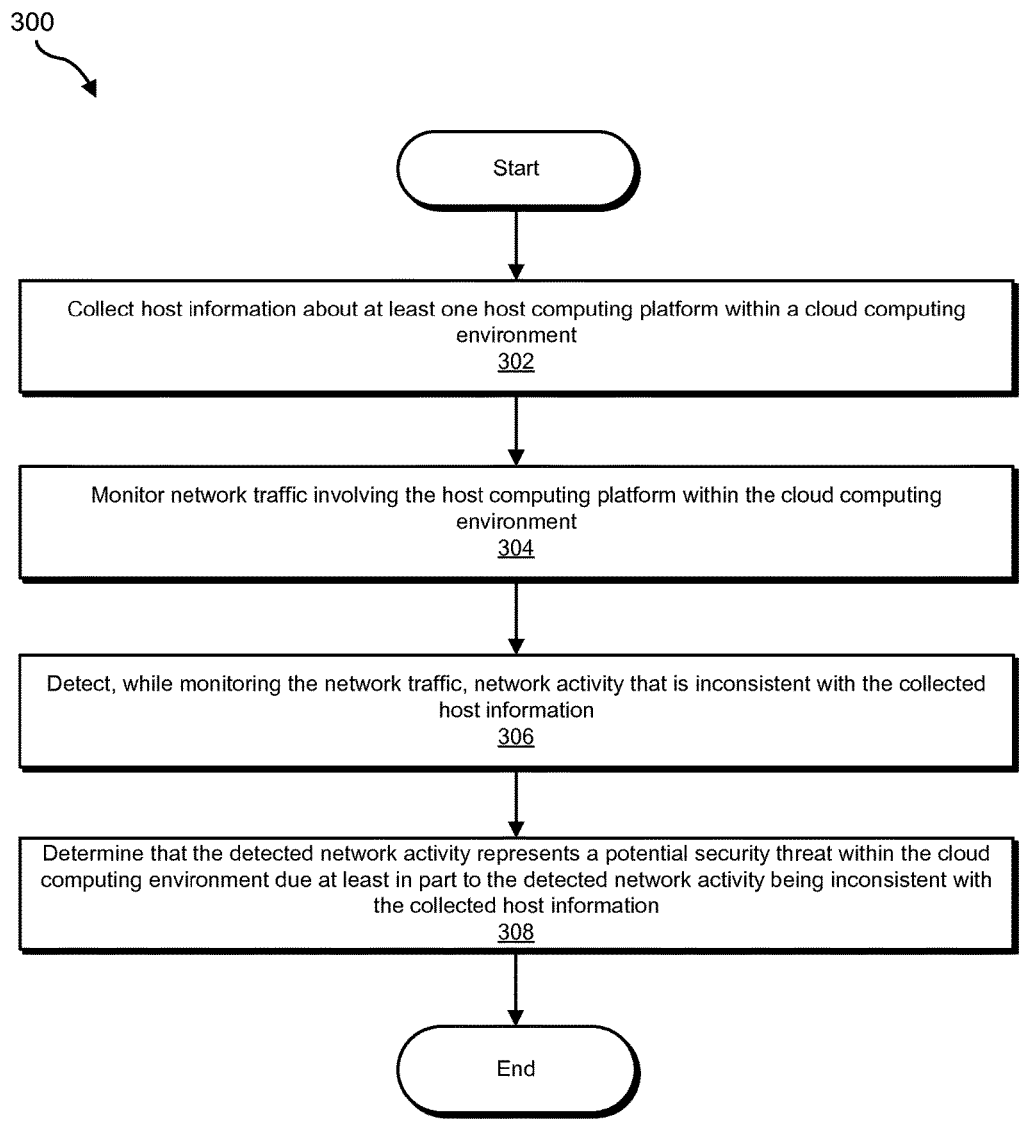
FIG. 3 is a flow diagram of an exemplary method for detecting security anomalies in a public cloud environment using network activity monitoring, application profiling, and self-building host mapping.

FIG. 3 is a flow diagram of an exemplary computer-implemented method 300 for detecting security anomalies in a public cloud environment using network activity monitoring, application profiling, and self-building host mapping. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may collect host information about at least one host computing platform within a cloud computing environment. For example, collection module 104 may, as part of server 206 and/or one or more of host computing platforms 202(1)-(N) in FIG. 2, collect host information 212. In this example, host information 212 may identify any communication channels that have previously facilitated communication between at least one host computing platform (e.g., host computing platform 202(1)) within cloud computing environment 210 and at least one additional computing platform (e.g., host computing platform 202(N) and/or another computing device not necessarily illustrated in FIG. 2). Additionally or alternatively, host information 212 may identify at least one application that has previously run on that host computing platform and/or been installed through an approved cloud-platform-specific deployment process (such as BEANSTALK, PUPPET, and/or APPLIPEDIA) within cloud computing environment 210.

In one example, host information 212 may also identify any applications that are expected to run on the host computing platform. Additionally or alternatively, host information 212 may identify any communication channels that are expected to be used by applications running on the host computing platform.

The systems described herein may perform step 302 in a variety of ways. In some examples, collection module 104 may collect and/or obtain at least a portion of host information 212 from a cloud service provider and/or firewall that services cloud computing environment 210. For example, collection module 104 may collect and/or obtain, from a cloud service provider and/or firewall, contextual information that identifies any Virtual Private Clouds (VPCs), any public and/or private subnets, any auto-scaling groups, and/or any public Internet Protocol (IP) addresses included and/or represented in cloud computing environment 210.

In some examples, collection module 104 may collect and/or obtain at least a portion of host information 212 from a cloud deployment tool used in connection with cloud computing environment 210. For example, collection module 104 may collect and/or obtain, from BEANSTALK or PUPPET, data that identifies and/or details any applications installed on and/or any applications that have previously run or are expected to run on a host computing platform (e.g., one or more of host computing platforms 202(1)-(N)). Additionally or alternatively, collection module 104 may collect and/or obtain, from APPLIPEDIA, data that identifies and/or details any specific characteristics of the applications installed on and/or any applications that have previously run or are expected to run on a host computing platform (e.g., one or more of host computing platforms 202(1)-(N)).

In some examples, security module 108 may perform application profiling using certain cloud-platform-specific deployment tools (such as BEANSTALK, PUPPET, and/or APPLIPEDIA). For example, security module 108 may whitelist applications that have previously run on a host computing platform (e.g., one or more of host computing platforms 202(1)-(N)) or are expected to run on the host computing platform based at least in part on information obtained from such cloud-platform-specific deployment tools.

In one example, collection module 104 may create, generate, and/or build host-specific communication profile 214 based at least in part on host information 212. In this example, host-specific communication profile 214 may serve and/or function as a baseline and/or reference of the known trusted communications between the host computing platform and the additional computing platform. Collection module 104 may apply a machine learning algorithm to at least a portion of host information 212 to construct host-specific communication profile 214.

In one example, collection module 104 may create, generate, and/or build host-specific application profile 216 based at least in part on host information 212. In this example, host-specific application profile 216 may serve and/or function as a baseline and/or reference of the known trusted applications that have previously run and/or been executed by the host computing platform. Collection module 104 may apply a machine learning algorithm to at least a portion of host information 212 to construct host-specific application profile 216.

In some examples, collection module 104 may collect additional host information that identifies any known trusted applications that have previously run on and/or been executed by an additional host computing platform (e.g., host computing platform 202(N)) within cloud computing environment 210. In such examples, collection module 104 may create an application whitelist that identifies all applications known to be trusted across host computing platforms 202(1)-(N) within cloud computing environment 210. The application whitelist may represent part of host information 212 and/or host-specific application profile 216.

In some examples, security module 108 may derive and/or develop a security policy to enforce against cloud computing environment 210 and/or one or more of host computing platforms 202(1)-(N) based at least in part on host information 212. For example, security module 108 may derive and/or develop one or more IDS and/or IPS policies to be enforced against at least a portion cloud computing environment 210 based at least in part on host information 212. In one example, the IDS and/or IPS policies may include and/or represent host-specific communication profile 214 and/or host-specific application profile 216.

As illustrated in FIG. 3, at step 304 one or more of the systems described herein may monitoring network traffic involving the host computing platform within the cloud computing environment. For example, monitoring module 106 may, as part of server 206 and/or one or more of host computing platforms 202(1)-(N) in FIG. 2, monitor network traffic involving one or more of host computing platforms 202(1)-(N) within cloud computing environment 210.

The systems described herein may perform step 304 in a variety of ways. In some examples, monitoring module 106 may monitor communications between host computing platforms 202(1)-(N). Additionally or alternatively, monitoring module 106 may monitor communications between one of host computing platforms 202(1)-(N) and another computing device not included in cloud computing environment 210.

As an example, monitoring module 106 may identify and/or inspect (by way of, e.g., deep packet inspection) data packets originating from and/or destined for one of computing platforms 202(1)-(N). In one example, monitoring module 106 may monitor east-to-west and/or west-to-east communications within a subnet or an auto-scaling group of cloud computing environment 210. The terms "east-to-west" and "west-to-east," as used herein in connection with communication, generally refer to any type or form of communication and/or data transfer that is transmitted from one host computing platform to another within a subnet or an auto-scaling group of a cloud computing environment.

In some examples, monitoring module 106 may monitor IDS and/or IPS events that occur within cloud computing environment 210. Additionally or alternatively, monitoring module 106 may monitor certain computing processes running on one or more of host computing platforms 202(1)-(N) within cloud computing environment 210. For example, monitoring module 106 may monitor the applications that are running on host computing platforms 202(1)-(N). In one example, monitoring module 106 may analyze network activity logs to identify any deviations from the expected activities with respect to host computing platforms 202(1)-(N).

As illustrated in FIG. 3, at step 306 one or more of the systems described herein may detect network activity that is inconsistent with the collected host information while monitoring the network traffic. For example, monitoring module 106 may, as part of server 206 and/or one or more of host computing platforms 202(1)-(N) in FIG. 2, detect network activity that is inconsistent with host information 212. In other words, monitoring module 106 may detect certain deviations from and/or anomalies with respect to host information 212.

The systems described herein may perform step 306 in a variety of ways. In some examples, monitoring module 106 may compare the detected network activity against host information 212, host-specific communication profile 214, and/or host-specific application profile 216. In such examples, monitoring module 106 may determine that the host computing platform has not previously performed the detected network activity. In other words, monitoring module 106 may determine that the detected network activity is not identified within host information 212, host-specific communication profile 214, and/or host-specific application profile 216.

As illustrated in FIG. 3, at step 308 one or more of the systems described herein may determine that the detected network activity represents a potential security threat within the cloud computing environment due at least in part to the detected network activity being inconsistent with the collected host information. For example, security module 108 may, as part of server 206 and/or one or more of host computing platforms 202(1)-(N) in FIG. 2, determine that the detected network activity represents a potential security threat and/or security anomaly within cloud computing environment 210 due at least in part to the detected network activity being inconsistent with host information 212. Examples of the potential security threat include, without limitation, malware, infiltrations, infections, viruses, worms, Trojan horses, spyware, adware, unsolicited bots, variations of one or more of the same, combinations of one or more of the same, or any other potential security threat.

The systems described herein may perform step 308 in a variety of ways. In some examples, security module 108 may determine the extent of deviation of the detected network activity from the baseline and/or reference activity represented in host information 212, host-specific communication profile 214, and/or host-specific application profile 216. For example, security module 108 may calculate a risk score of the potential security threat based at least in part on the detected network activity. In this example, security module 108 may compare the risk score to one or more thresholds that correspond to different security actions intended to remedy the potential security threat.

Security module 108 may then determine the appropriate security action based at least in part on the comparison. In other words, security module 108 may identify a security action that is commensurate with the risk score. Upon identifying the security action that is commensurate with the risk score, security module 108 may perform the security action in connection with the host computing platform in an attempt to remedy the potential security threat.

As a specific example of the security action, security module 108 may quarantine a potentially infected host computing platform to prevent that host computing platform from infecting any other host computing platforms within cloud computing environment 210. As another specific example, security module 108 may shut down a potentially infected host computing platform to prevent that host computing platform from infecting any other host computing platforms within cloud computing environment 210. In a further example, security module 108 may block communication between a potentially infected host computing platform and any other host computing platforms within cloud computing environment 210.

As an additional example, security module 108 may replace a potentially infected host computing platform within cloud computing environment 210 by transferring at least one computing task of that host computing platform to at least one additional host computing platform within cloud computing environment 210. For example, security module 108 may cause an application running on a potentially infected host computing platform to fail over to and/or spin up on a redundant host computing platform within cloud computing environment 210. More specifically, security module 108 may cause an application running on a potentially infected host computing platform within a particular subnet and/or auto-scaling group to fail over to and/or spin up on a redundant host computing platform within that particular subnet and/or auto-scaling group.

In one example, security module 108 may update host information 212 to improve the accuracy of security threat detection within cloud computing environment 210 based at least in part on the detected network activity. For example, monitoring module 106 and/or security module 108 may analyze the network activity logs with respect to host information 212, host-specific communication profile 214, and/or host-specific application profile 216. By analyzing the network activity logs in this way, monitoring module 106 and/or security module 108 may be able to modify host information 212, host-specific communication profile 214, and/or host-specific application profile 216 to eliminate and/or mitigate false positives and/or increase the accuracy of security threat detection.

In one example, security module 108 may identify, based at least in part on the detected network activity, an attack path of the potential security threat with respect to the host computing platform within cloud computing environment 210. In other words, security module 108 may trace the infection from its destination and/or target back to the likely source of infection. As a specific example in connection with FIG. 4, exemplary system 400 may include Internet 402 in communication with cloud computing environment 210 via firewall 404. Cloud computing environment 210 may include host computing platforms 202(1), 202(2), 202(3), 202(4), 202(5), 202(6), 202(7), 202(8), and 202(9). In this example, security module 108 may determine that host computing platform 202(8) in FIG. 4 has likely been infected by malware. Upon making this determination, security module 108 may analyze the activity logs of host computing platform 202(8) in FIG. 4 and then determine, based at least in part on this analysis, that the infection was passed from host computing platform 202(6) in FIG. 4.

Figure 4:
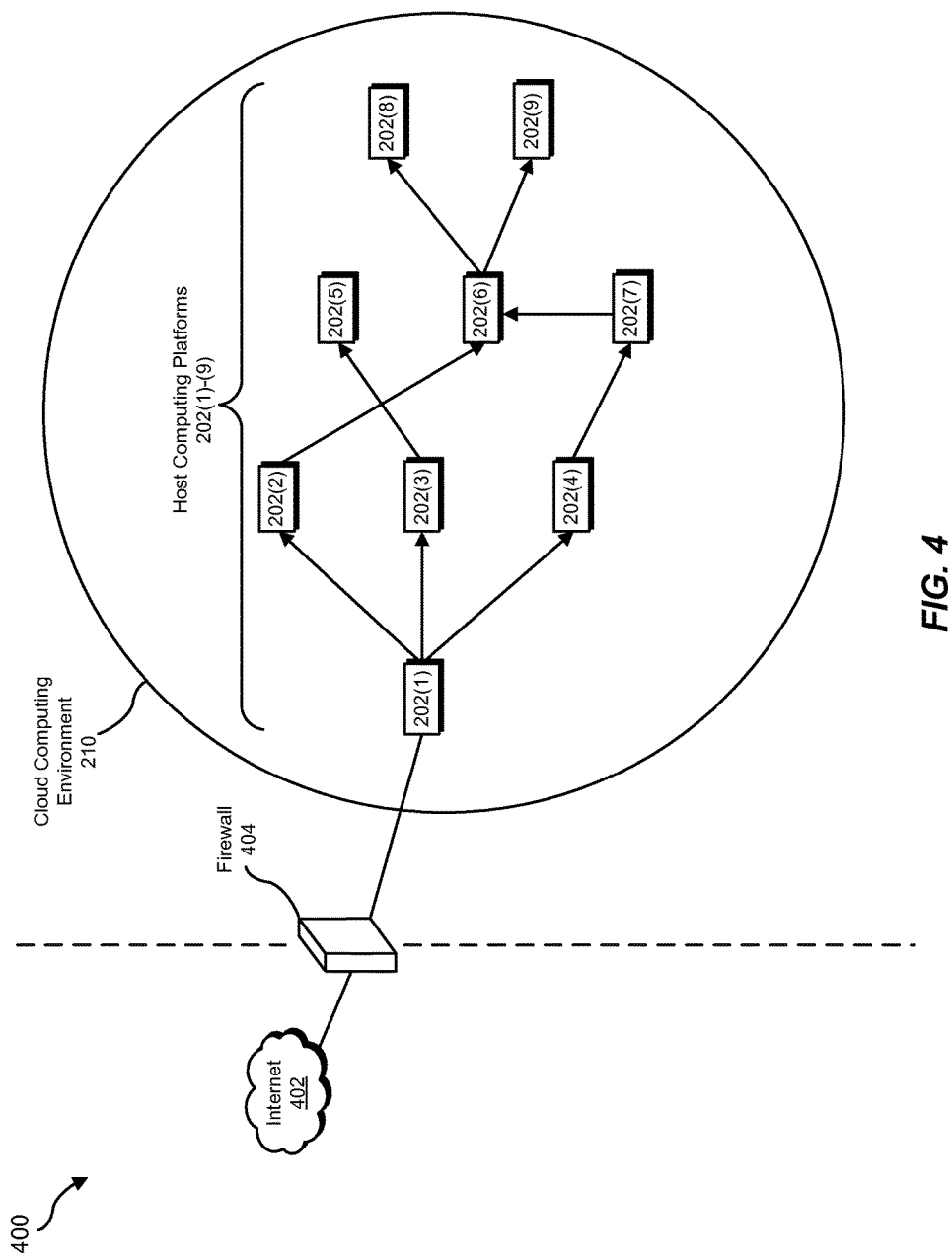
FIG. 4 is a block diagram of an additional exemplary system for detecting potential security threats in cloud computing environments.
Figure 5:
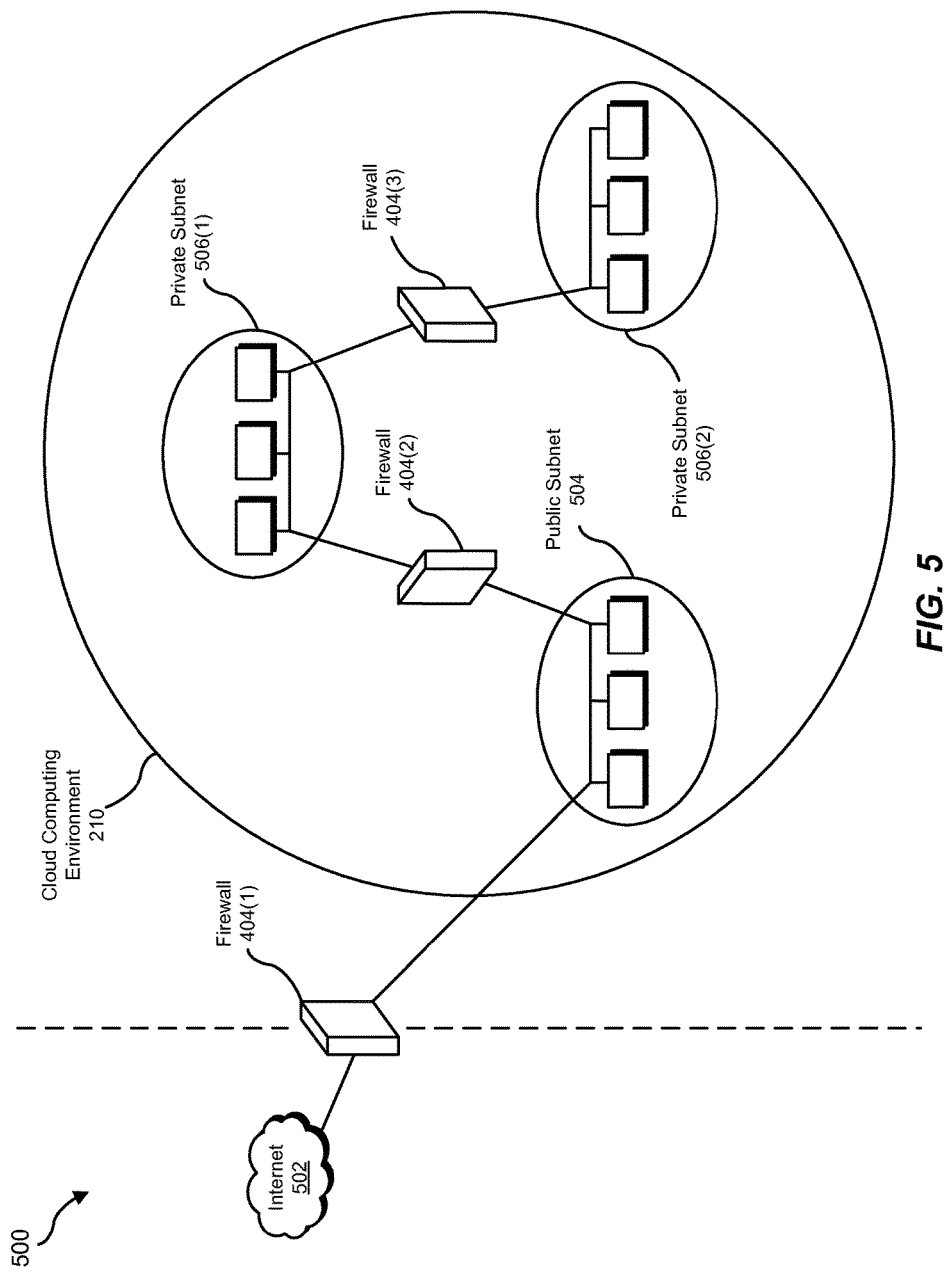
FIG. 5 is a block diagram of an additional exemplary system for detecting potential security threats in cloud computing environments.

Continuing with this example, security module 108 may also perform similar analyses on the activity logs of each node that encountered the malware on its way to host computing platform 202(8) in FIG. 4. After concluding all of these analyses, security module 108 may be able to accurately identify the likely attack path of the malware infection. For example, security module 108 may determine that the malware infection originated from Internet 402 in FIG. 4 and then proceeded to host computing platform 202(1) via firewall 404 in FIG. 4. Security module 108 may further determine that, from host computing platform 202(1), the malware infection spread to host computing platform 202(2), host computing platform 202(6), and then finally host computing platform 202(8). Security module 108 may also inspect any or all of the host computing platforms included in the attack path for the possibility of infection.

As a specific example, host-specific communication profile 214 may indicate that host computing platform 202(1) typically sends payloads of approximately 20 kilobytes to the Internet. In this example, monitoring module 106 may determine that host computing platform 202(1) is now sending one or more payloads of approximately 15 megabytes to the Internet. As a result, security module 108 may determine that host computing platform 202(1) has likely been compromised and/or infected. Security module 108 may then shut down host computing platform 202(1) and/or replace host computing platform 202(1) with another one of host computing platforms 202(1)-(N) to prevent the spread of infection within cloud computing environment 210.

As another specific example, host-specific application profile 216 may indicate that host computing platform 202(N) has historically executed application 218(1) but make no mention of application 218(N). In this example, monitoring module 106 may detect an incoming request to host computing platform 202(N) from a greylisted website of questionable trustworthiness and/or reputation. After detecting this incoming request, monitoring module 106 may determine that host computing platform 202(N) is now executing application 218(N), which is uncharacteristic of host computing platform 218(N) in view of host-specific application profile 216. As a result, security module 108 may determine that host computing platform 202(N) has likely been compromised and/or infected. Security module 108 may then shut down host computing platform 202(N) and/or replace host computing platform 202(1) with another one of host computing platforms 202(1)-(N) to prevent the spread of infection within cloud computing environment 210.

As a further specific example, host-specific communication profile 214 may indicate that host computing platform 202(1) does not typically communicate with host computing platform 202(N). In this example, monitoring module 106 may detect communication initiated by host computing platform 202(1) toward host computing platform 202(N). As a result, security module 108 may determine that host computing platform 202(1) has likely been compromised and/or infected. Security module 108 may then shut down host computing platform 202(1) and/or replace host computing platform 202(1) with another one of host computing platforms 202(1)-(N) to prevent the spread of infection within cloud computing environment 210.

In one example, security module 108 may prevent east-to-west and/or west-to-east communications within a subnet or an auto-scaling group of cloud computing environment 210. As a specific example in connection with FIG. 5, exemplary system 500 may include Internet 402 in communication with cloud computing environment 210 via firewall 404(1). Cloud computing environment 210 may include a public subnet 504, a private subnet 506(1), and a private subnet 506(2). Each of these subnets may include and/or represent groupings of host computing platforms. In this example, public subnet 504 and private subnet 506(1) may be in communication with one another via firewall 404(2). Similarly, private subnet 506(1) and private subnet 506(2) may be in communication with one another via firewall 404(3).

In the event that one of the host computing platforms within public subnet 504 has been infected by malware, security module 108 may prevent east-to-west and/or west-to-east communications within public subnet 504 until the infection has been addressed. Similarly, in the event that one of the host computing platforms within private subnet 506(1) or 506(2) has been infected by malware, security module 108 may prevent east-to-west and/or west-to-east communications within private subnet 506(1) or 506(2) until the infection has been addressed.

Figure 6:
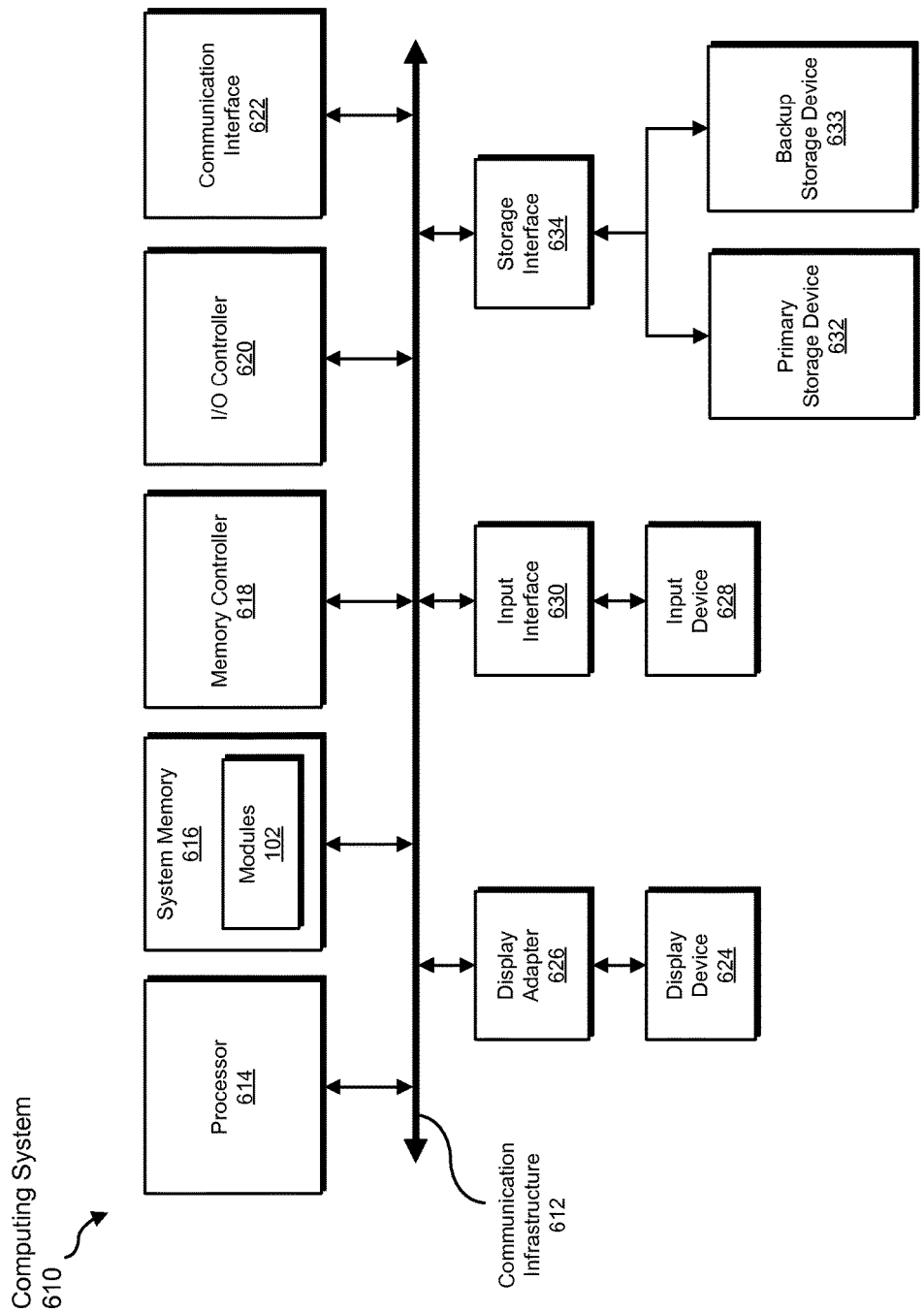
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
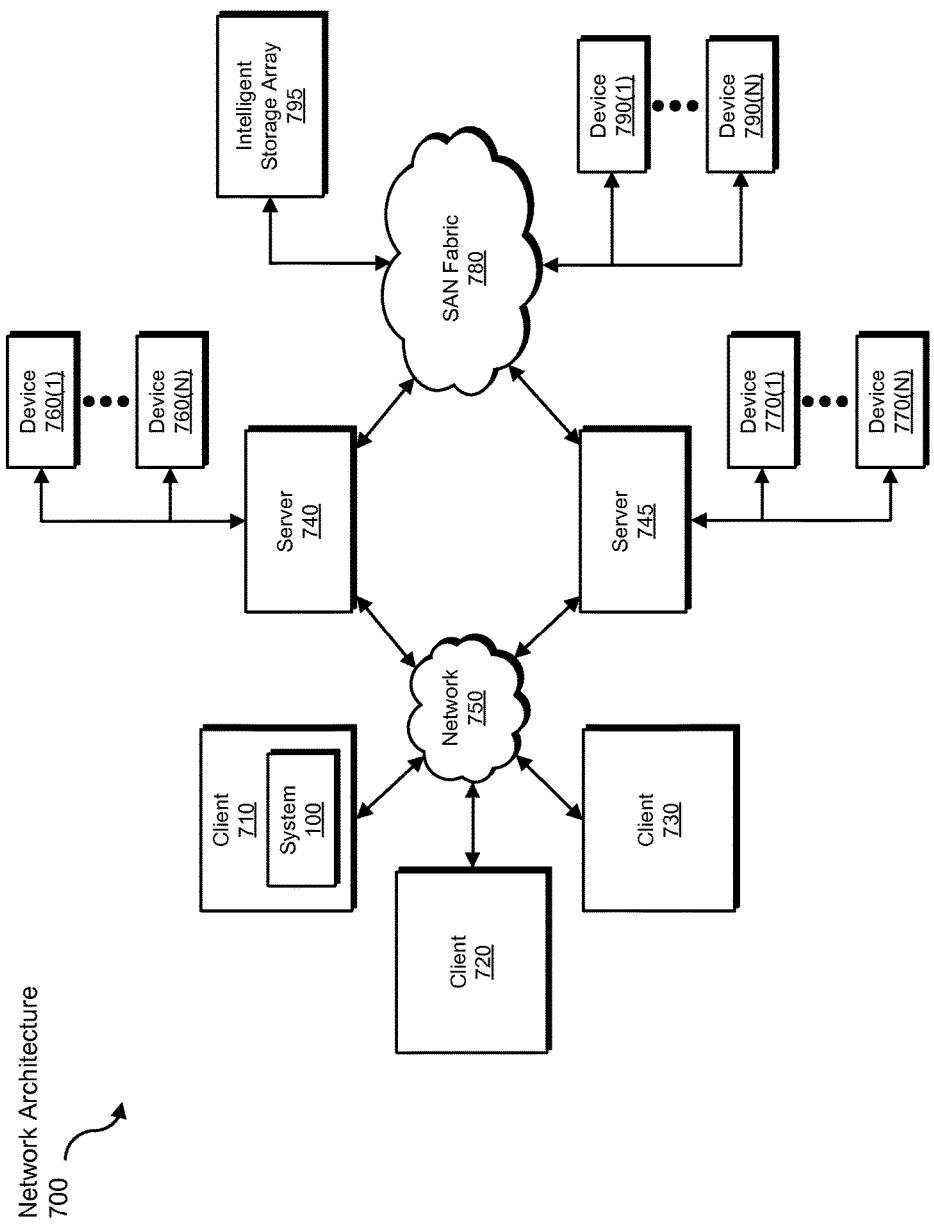
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting security anomalies in a public cloud environment using network activity monitoring, application profiling, and self-building host mapping.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive host information to be transformed, transform the host information, output a result of the transformation to create a host-specific communication profile and/or a host-specific application profile, use the result of the transformation to detect intrusion and/or infection within a cloud computing environment, and store the result of the transformation for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting security anomalies in a public cloud environment using network activity monitoring, application profiling, and self-building host mapping, at least a portion of the method being performed by a computing device comprising at least one processor, the method comprising:
   collecting host information that identifies at least one of:
      at least one communication channel that has previously facilitated communication between at least one host computing platform within a cloud computing environment and at least one additional computing platform; and
      at least one application that has previously run on the host computing platform or been installed through an approved cloud-platform-specific deployment process within the cloud computing environment;
   creating, based at least in part on the host information, a host-specific communication profile that identifies known trusted communications between the host computing platform and the additional computing platform; and
   creating, based at least in part on the host information, a host-specific application profile that identifies known trusted applications previously executed by the host computing platform;
   monitoring network traffic involving the host computing platform within the cloud computing environment;
   while monitoring the network traffic, detecting network activity that is inconsistent with the collected host information by:
      comparing the detected network activity against at least one of:
         the host-specific communication profile; and
         the host-specific application profile;
      determining, based at least in part on the comparison, that the host computing platform has not previously performed the detected network activity; and
      determining that the detected network activity represents a potential security threat within the cloud computing environment due at least in part to the detected network activity being inconsistent with the collected host information.

2. The method of claim 1, further comprising performing at least one security action in connection with the host computing platform in an attempt to remedy the potential security threat.

3. The method of claim 2, wherein the at least one security action comprises at least one of:
   quarantining the host computing platform relative to the cloud computing environment to prevent the host computing platform from infecting any other host computing platforms within the cloud computing environment;
   shutting down the host computing platform to prevent the host computing platform from infecting any other host computing platforms within the cloud computing environment;
   blocking communication between the host computing platform and any other host computing platforms within the cloud computing environment; and
   replacing the host computing platform within the cloud computing environment by transferring at least one computing task of the host computing platform to at least one additional host computing platform within the cloud computing environment.

4. The method of claim 2, wherein:
   determining that the detected network activity represents the potential security threat comprises calculating, based at least in part on the detected network activity, a risk score of the potential security threat; and
   performing the at least one security action in connection with the host computing platform comprises:
      determining that the at least one security action is commensurate with the risk score; and
      performing the at least one security action that is commensurate with the risk score in connection with the host computing platform.

5. The method of claim 1, wherein at least one of:
   creating the host-specific communication profile comprises obtaining at least a portion of the host information from a cloud service provider that services the cloud computing environment; and
   creating the host-specific application profile comprises obtaining at least a portion of the host information from a cloud deployment tool used in connection with the cloud computing environment.

6. The method of claim 1, wherein at least one of:
   creating the host-specific communication profile comprises creating the host-specific communication profile by applying a machine learning algorithm to at least a portion of the host information; and
   creating the host-specific application profile comprises creating the host-specific application profile by applying a machine learning algorithm to at least a portion of the host information.

7. The method of claim 1, wherein determining that the detected network activity represents the potential security threat comprises updating, based at least in part on the detected network activity, the host information to improve the accuracy of security threat detection within the cloud computing environment.

8. The method of claim 1, wherein determining that the detected network activity represents the potential security threat comprises identifying, based at least in part on the detected network activity, an attack path of the potential security threat with respect to the host computing platform within the cloud computing environment.

9. The method of claim 1, further comprising:
   collecting additional host information that identifies at least one application that has previously run on an additional host computing platform within the cloud computing environment; and
   creating, based at least in part on the host information and the additional host information, an application whitelist that identifies applications known to be trusted across all host computing platforms within the cloud computing environment.

10. A system for detecting security anomalies in a public cloud environment using network activity monitoring, application profiling, and self-building host mapping, the system comprising:
- a collection module, stored in memory, that:
  - collects host information that identifies at least one of:
    - at least one communication channel that has previously facilitated communication between at least one host computing platform within a cloud computing environment and at least one additional computing platform; and
    - at least one application that has previously run on the host computing platform within the cloud computing environment;
  - creates, based at least in part on the host information, a host-specific communication profile that identifies known trusted communications between the host computing platform and the additional computing platform; and
  - creates, based at least in part on the host information, a host-specific application profile that identifies known trusted applications previously executed by the host computing platform;
- a monitoring module, stored in memory, that:
  - monitors network traffic involving the host computing platform or been installed through an approved cloud-platform-specific deployment process within the cloud computing environment; and
  - detects, while monitoring the network traffic, network activity that is inconsistent with the collected host information by:
    - comparing the detected network activity against at least one of:
      - the host-specific communication profile; and
      - the host-specific application profile; and
    - determining, based at least in part on the comparison, that the host computing platform has not previously performed the detected network activity;
- a security module, stored in memory, that determines that the detected network activity represents a potential security threat within the cloud computing environment due at least in part to the detected network activity being inconsistent with the collected host information; and
- at least one physical processor that executes the collection module, the monitoring module, and the security module.

11. The system of claim 10, wherein the security module performs at least one security action in connection with the host computing platform in an attempt to remedy the potential security threat.

12. The system of claim 11, wherein the at least one security action comprises at least one of:
- quarantining the host computing platform relative to the cloud computing environment to prevent the host computing platform from infecting any other host computing platforms within the cloud computing environment;
- shutting down the host computing platform to prevent the host computing platform from infecting any other host computing platforms within the cloud computing environment;
- blocking communication between the host computing platform and any other host computing platforms within the cloud computing environment; and
- replacing the host computing platform within the cloud computing environment by transferring at least one computing task of the host computing platform to at least one additional host computing platform within the cloud computing environment.

13. The system of claim 11, wherein the security module:
- calculates, based at least in part on the detected network activity, a risk score of the potential security threat; and
- performs the at least one security action in connection with the host computing platform by:
  - determining that the at least one security action is commensurate with the risk score; and
  - performing the at least one security action that is commensurate with the risk score in connection with the host computing platform.

14. The system of claim 10, wherein at least one of:
- the collection module creates the host-specific communication profile by obtaining at least a portion of the host information from a cloud service provider that services the cloud computing environment; and
- the collection module creates the host-specific application profile by obtaining at least a portion of the host information from a cloud deployment tool used in connection with the cloud computing environment.

15. The system of claim 10, wherein the security module identifies, based at least in part on the detected network activity, an attack path of the potential security threat with respect to the host computing platform within the cloud computing environment.

16. A non-transitory computer-readable medium comprising one or more computer-executable instructions that, when executed by at least one processor of a computing device, cause the computing device to:
- collect host information that identifies at least one of:
  - at least one communication channel that has previously facilitated communication between at least one host computing platform within a cloud computing environment and at least one additional computing platform; and
  - at least one application that has previously run on the host computing platform within the cloud computing environment or been installed through an approved cloud-platform-specific deployment process;
- create, based at least in part on the host information, a host-specific communication profile that identifies known trusted communications between the host computing platform and the additional computing platform;
- create, based at least in part on the host information, a host-specific application profile that identifies known trusted applications previously executed by the host computing platform;
- monitor network traffic involving the host computing platform within the cloud computing environment;
- detect, while monitoring the network traffic, network activity that is inconsistent with the collected host information by:
  - comparing the detected network activity against at least one of:
    - the host-specific communication profile; and
    - the host-specific application profile; and
  - determining, based at least in part on the comparison, that the host computing platform has not previously performed the detected network activity; and
- determine that the detected network activity represents a potential security threat within the cloud computing environment due at least in part to the detected network activity being inconsistent with the collected host information.

* * * * *